(12) United States Patent
Jones et al.

(10) Patent No.: US 9,098,345 B2
(45) Date of Patent: Aug. 4, 2015

(54) SYSTEM AND METHOD FOR PORTABLE AND FLEXIBLE DEPLOYMENT OF SERVERS

(75) Inventors: Marc Jones, Carrollton, TX (US); Duke Skarda, Colleyville, TX (US)

(73) Assignee: Softlayer Technologies, Inc., Dallas, TX (US)

( * ) Notice: Subject to any disclaimer, the term of this patent is extended or adjusted under 35 U.S.C. 154(b) by 335 days.

(21) Appl. No.: 13/418,647

(22) Filed: Mar. 13, 2012

(65) Prior Publication Data

US 2013/0198354 A1 Aug. 1, 2013

Related U.S. Application Data

(60) Provisional application No. 61/593,653, filed on Feb. 1, 2012.

(51) Int. Cl.
| | |
|---|---|
| *H04L 29/08* | (2006.01) |
| *H04L 12/24* | (2006.01) |
| *G06F 9/50* | (2006.01) |
| *G06Q 10/06* | (2012.01) |
| *G06F 9/445* | (2006.01) |
| *G06F 9/455* | (2006.01) |

(52) U.S. Cl.
CPC ............... *G06F 9/5072* (2013.01); *G06F 8/63* (2013.01); *G06F 9/45558* (2013.01); *G06F 2009/45562* (2013.01); *G06Q 10/06* (2013.01); *H04L 41/0806* (2013.01); *H04L 67/00* (2013.01)

(58) Field of Classification Search
CPC .............. H04L 29/08072; H04L 29/06; H04L 29/08144; H04L 41/22; H04L 67/00; H04L 41/0806; G06F 9/4401; G06F 9/5072; G06Q 10/06
See application file for complete search history.

(56) References Cited

U.S. PATENT DOCUMENTS

| | | | | |
|---|---|---|---|---|
| 5,495,607 | A | * | 2/1996 | Pisello et al. ................. 707/797 |
| 7,047,177 | B1 | * | 5/2006 | Lee et al. ........................ 703/22 |
| 7,213,065 | B2 | | 5/2007 | Watt |
| 7,730,480 | B2 | | 6/2010 | Isaacson |
| 7,885,276 | B1 | * | 2/2011 | Lin ............................... 370/401 |
| 8,443,077 | B1 | * | 5/2013 | Lappas et al. ................. 709/224 |
| 8,473,587 | B1 | * | 6/2013 | Lappas et al. ................. 709/220 |
| 8,484,355 | B1 | * | 7/2013 | Lochhead et al. ............ 709/226 |
| 2003/0126202 | A1 | * | 7/2003 | Watt ............................... 709/203 |
| 2005/0120160 | A1 | * | 6/2005 | Plouffe et al. ..................... 711/1 |
| 2008/0109549 | A1 | * | 5/2008 | Nakagawa et al. ........... 709/225 |
| 2009/0241030 | A1 | * | 9/2009 | von Eicken et al. .......... 715/735 |
| 2009/0276771 | A1 | * | 11/2009 | Nickolov et al. ............. 717/177 |
| 2009/0300057 | A1 | | 12/2009 | Friedman |

(Continued)

*Primary Examiner* — Ario Etienne
*Assistant Examiner* — Ho Shiu
(74) *Attorney, Agent, or Firm* — Schmeiser, Olsen & Watts, LLP

(57) ABSTRACT

A system of portable and flexible deployment of dedicated and virtual servers comprises a plurality of geographically-dispersed data centers comprising a plurality of dedicated servers, a plurality of hosts operable to host a plurality of virtual servers, a management workstation operable to capture dedicated and virtual server images, an image repository operable to store the captured server images, and an intra-data center networking infrastructure enabling communication within the data center. An integrated management system is operable to control and manage deployment of server images to dedicated and virtual servers located in a user-specified data center, and an inter-data center networking infrastructure enables communication between the plurality of data centers.

11 Claims, 10 Drawing Sheets

(56) References Cited

U.S. PATENT DOCUMENTS

| | | |
|---|---|---|
| 2009/0300604 A1 | 12/2009 | Barringer |
| 2010/0131948 A1 | 5/2010 | Ferris |
| 2010/0306354 A1 | 12/2010 | DeHaan |
| 2010/0306377 A1 | 12/2010 | DeHaan |
| 2010/0306765 A1 | 12/2010 | DeHaan |
| 2010/0306767 A1 | 12/2010 | DeHaan |
| 2011/0071983 A1* | 3/2011 | Murase .................. 707/649 |
| 2011/0320411 A1* | 12/2011 | Henderson .............. 707/687 |
| 2013/0007435 A1* | 1/2013 | Bayani ..................... 713/2 |
| 2013/0013764 A1* | 1/2013 | Li et al. .................. 709/224 |
| 2013/0031500 A1* | 1/2013 | Bhola et al. ............ 715/769 |
| 2013/0159723 A1* | 6/2013 | Brandt et al. ........... 713/176 |
| 2013/0296045 A1* | 11/2013 | Dun et al. ............... 463/31 |
| 2014/0040343 A1* | 2/2014 | Nickolov et al. ........ 709/201 |

\* cited by examiner

SYSTEM AND METHOD FOR PORTABLE AND FLEXIBLE DEPLOYMENT OF SERVERS

FIELD

The present disclosure relates to a system and method for portable and flexible deployment of servers, and more particularly to a system and method that enables image capture of and deployment to both dedicated and virtual servers.

BACKGROUND

Cloud computing has become a popular option for many entities and individuals to expand their computing and storage capacities in a cost-effective and dynamic manner. Cloud providers operate one or more data centers that typically include a collection of servers, storage elements, and networking infrastructure such as routers and switches. Cloud providers deliver computing capacity as a combination of hardware and software resources to its users regardless of geographical, physical, and other limitations.

To increase utilization and efficiency, cloud providers use virtualization to enable virtual servers or instances (also known as cloud servers and virtual private servers) that are hosted on physical servers. Virtualization enables a server to host multiple virtual servers accessible by multiple end users and rely on software to maintain data security and privacy. Depending on need, an end user may scale up or down the amount of resources it leases from the cloud provider on a dynamic basis.

A dedicated server, on the other hand, is a physical server that has dedicated access for a particular end user. Certain advantages may be realized through the use of dedicated servers such as performance, speed, and data security. However, unlike the virtual servers, deployment of dedicated servers is a much more time consuming task requiring a custom build each time.

A cloud provider may enable its end users to choose cloud computing services delivery using only virtual servers, only dedicated servers, a combination of virtual and dedicated servers.

SUMMARY

A system of portable and flexible deployment of dedicated and virtual servers comprises a plurality of geographically-dispersed data centers comprising a plurality of dedicated servers, a plurality of hosts operable to host a plurality of virtual servers, a management workstation operable to capture dedicated and virtual server images, an image repository operable to store the captured server images, and an intra-data center networking infrastructure enabling communication within the data center. An integrated management system is operable to control and manage deployment of server images to dedicated and virtual servers located in a user-specified data center, and an inter-data center networking infrastructure enables communication between the plurality of data centers.

A method of portable and flexible deployment of dedicated and virtual servers comprises receiving, at a user interface including customer web portal, a mobile application, or programmatic API, a user input of an order requesting the deployment of a dedicated or virtual server at a specified data center location, receiving, at the user interface, a user input of a selection of a server image to be deployed, creating, at an integrated management system, a deployment transaction, automatically selecting a dedicated or virtual server according to the user input, automatically deploying the selected server image including a specification of an operating system to the selected server, and automatically booting the selected server using the specified operating system.

BRIEF DESCRIPTION OF THE DRAWINGS

FIG. 9 is a screen shot of an exemplary disk image cloud capture screen via a customer web portal; and FIG. 10 is a screen shot of an exemplary disk image cloud deployment screen via a customer web portal.

DETAILED DESCRIPTION

The deployment of a dedicated server at a cloud provider is typically a time-consuming task. The user is required to select the computing platform, the operating system, the storage elements, the network configuration, and other features, and the cloud provider must provision, load, and configure a physical server according to the user's preferences and selection. The deployment may take hours or even days to complete. On the other hand, the deployment of a virtual server can be very quick in comparison.

Virtual server deployment can be efficiently performed using an image management tool such as DYNACENTER provided by Racemi, Inc. DYNACENTER is described in U.S. Pat. No. 7,213,065 (the '065 patent) entitled System and Method for Dynamic Server Allocation and Provisioning. DYNACENTER is an exemplary third party software tool employed herein to perform image capture and deployment.

Figure 1:
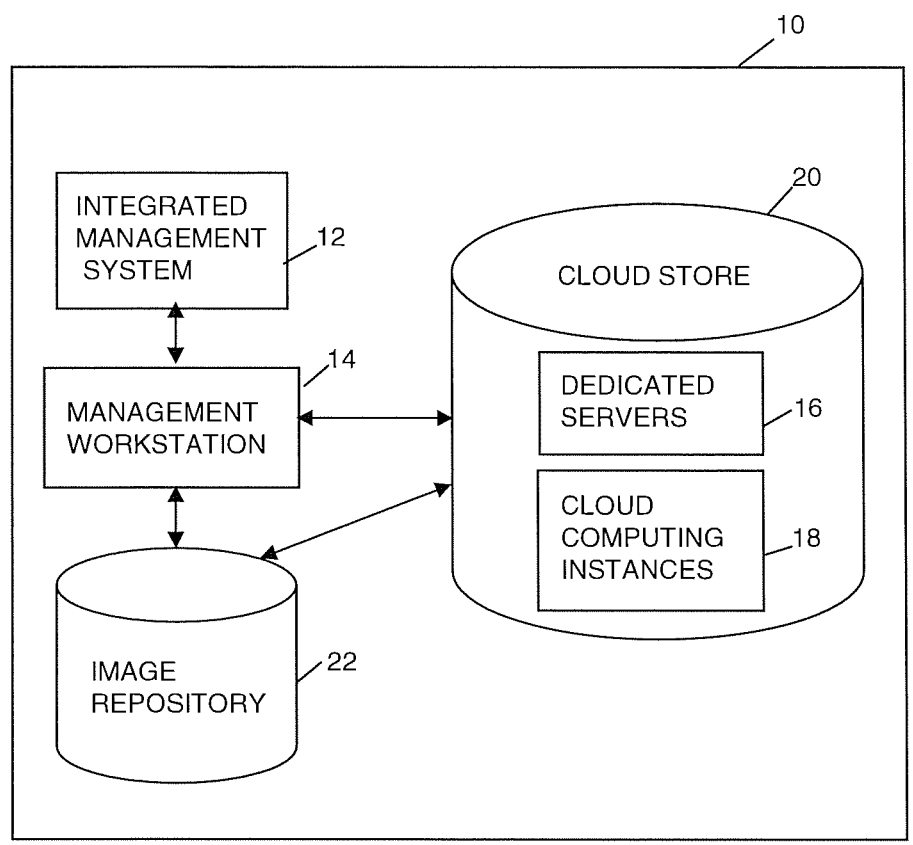
FIG. 1 is a simplified block diagram of an exemplary system and method for portable and flexible deployment of servers according to an embodiment of the present disclosure.

FIG. 1 is a simplified block diagram of an exemplary system 10 for portable and flexible deployment of server image according to an embodiment of the present disclosure. FIG. 1 shows a basic architecture of a data center that includes an integrated management system (IMS) 12 in communications with a management workstation (MWS) 14. The integrated management system 12 is the primary system for provisioning dedicated and virtual servers in the data center and preferably includes a web-based application to provide a web portal interface to the end users and system administrators. Other suitable user interfaces include mobile applications, programmatic API (application program interface), and other suitable implementations. The management workstation 14 is the primary system used to capture the images of dedicated servers 16 and virtual servers (cloud computing instances or CCI) 18, which form the cloud store 20 of the data center. The cloud store 20 represents the computing and data storage resource accessible to the end users. A dedicated or virtual server image may include its root file system, kernel, applications, data, etc. and an image repository 22 is used to store the captured server images. The image repository 22 may be implemented by suitable storage devices such as one or more network attached storage (NAS) that contain all working server images in the respective data centers, and the software, data, and support required to create and maintain the stored images. In a preferred embodiment, the image repository 22 may be located in the cloud store 20.

It should be noted that other conventional data center components such as networks, network switching infrastructure, firewalls, load balancing elements, etc. are not shown in FIG. 1 for the sake of clarity. In a preferred embodiment, the data center employs a "pod" architecture comprising an integrated management system, management workstation, cloud store, and image repository. A data center may comprise multiple duplicative pods under the management and control of a single integrated management system 12, for example.

Figure 2:
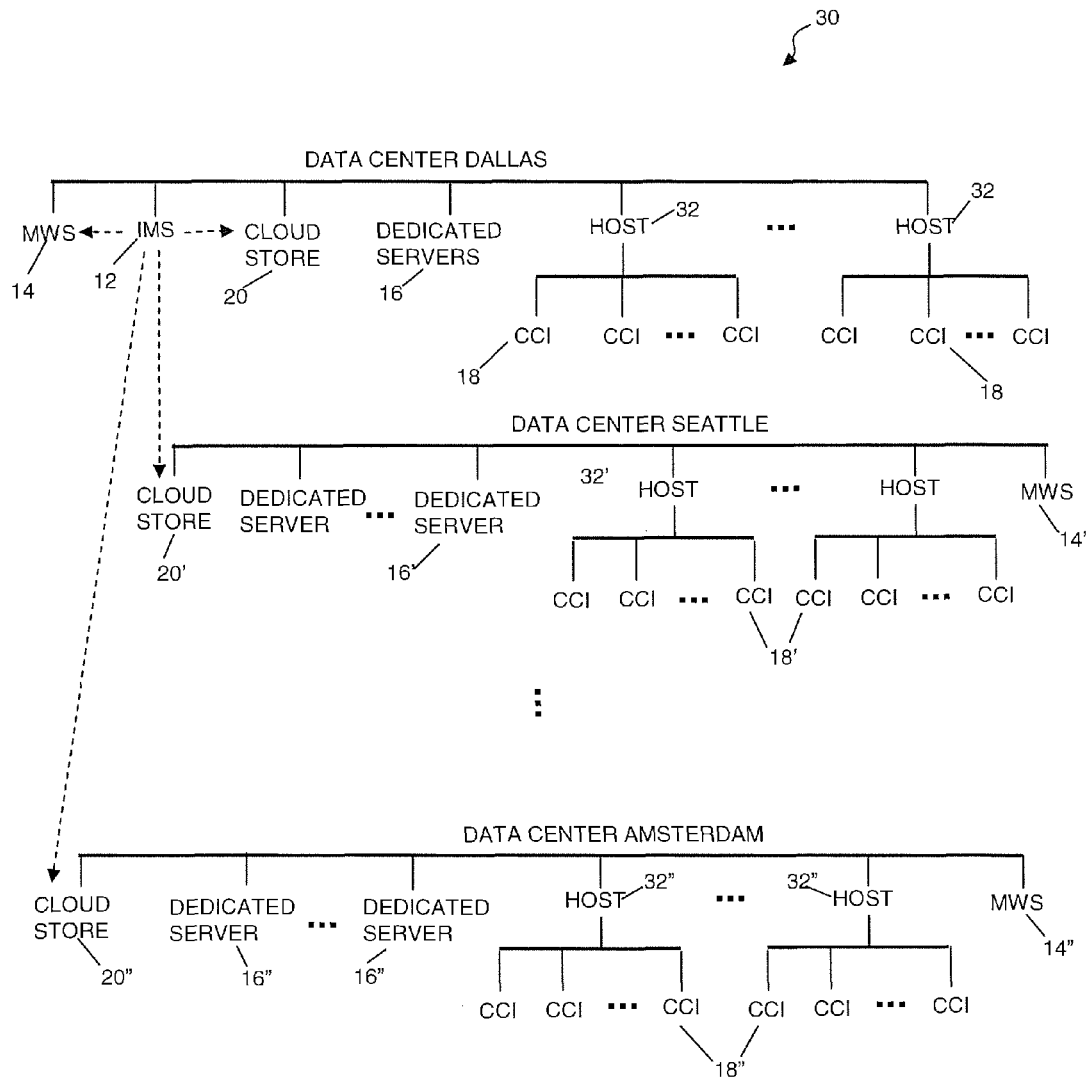
FIG. 2 is a simplified diagram of an exemplary system and method for portable and flexible deployment of servers according to an embodiment of the present disclosure.

FIG. 2 is a simplified diagram of another exemplary system 30 for portable and flexible deployment of server image according to an embodiment of the present disclosure. System 30 is a multi-data center with data centers located in more than one continent to service its globally-based customers. For example, Data Center Dallas is the primary data center site and includes the integrated management system 12 for the management and control of all the data centers in the entire system. The integrated management system 12 is further in communications with the management workstation 14 at Data Center Dallas, and the cloud stores 20, 20', 20" of Data Center Dallas, as well as secondary data centers, including Data Center Seattle, Data Center Amsterdam, and other data centers in the system. For server image capture, each secondary data center may be under the control and management of the primary management workstation 14, or alternatively under its own management workstations 14' and 14". As shown in FIG. 2, each data center comprises dedicated servers 16, 16', and 16", as well as hosts 32, 32', and 32" with their respective cloud computing instances (virtual servers) 18, 18', and 18". The host typically runs a hypervisor, a special operating software that is tasked with creating, releasing, and managing the resources of guest operating systems or virtual servers.

Described in more detail below, system 30 is operable, under the control of integrated management system 12, to capture the image of any dedicated and virtual server, located at any data center, store the captured image at any cloud store (data center) location, and deploy the captured image to any existing or new dedicated or virtual server at any data center.

Figure 3:
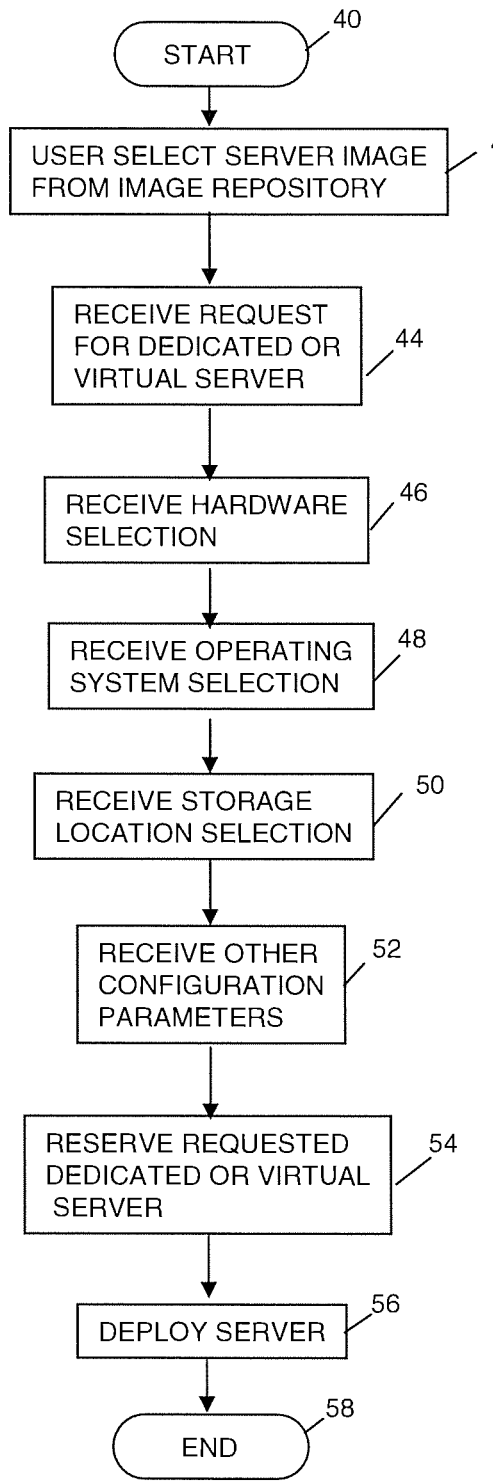
FIG. 3 is a simplified flowchart of an exemplary process of server image capturing and deployment according to an embodiment of the present disclosure.

FIG. 3 is a simplified flowchart of an exemplary process 40 of server image deployment according to an embodiment of the present disclosure. The sequence of the flowchart shown in FIG. 3 is exemplary and other suitable ordering of the operations are contemplated. In block 42, the user may select a server image from the image repository. In block 44, a request for new server deployment from the user or system administrator is received. The request may be for the deployment of a dedicated server or virtual server. In the case of an end user, this request may be in the form of an order for new service received via the customer web portal, mobile application, or programmatic API. In block 46, the process receives a user selection of hardware. For a virtual server order, the user may indicate the data center location, desired amount of CPU speed (e.g., 1×2.0 GHz, 2×2.0 GHz, 3×2.0 GHz, etc.), desired random access memory (RAM) capacity, and storage (local or storage area network (SAN)) capacity. For a dedicated server, the user has the ability to specify the data center location, and a number of parameters for the processor, such as manufacture, type, number of processors, CPU speed, bus speed, cache capacity, and RAM capacity. In block 48, the process receives a user selection of the desired operating system to be run on the server. Alternatively, the system may assign a default operating system which may be overridden by the user. In block 50, the user may indicate a preferred storage location for the selected server. In block 52, other system configuration parameters may be specified by the user as needed. In block 54, the requested dedicated or virtual server is reserved, and is deployed in block 56. The process ends in block 58.

Figure 7:
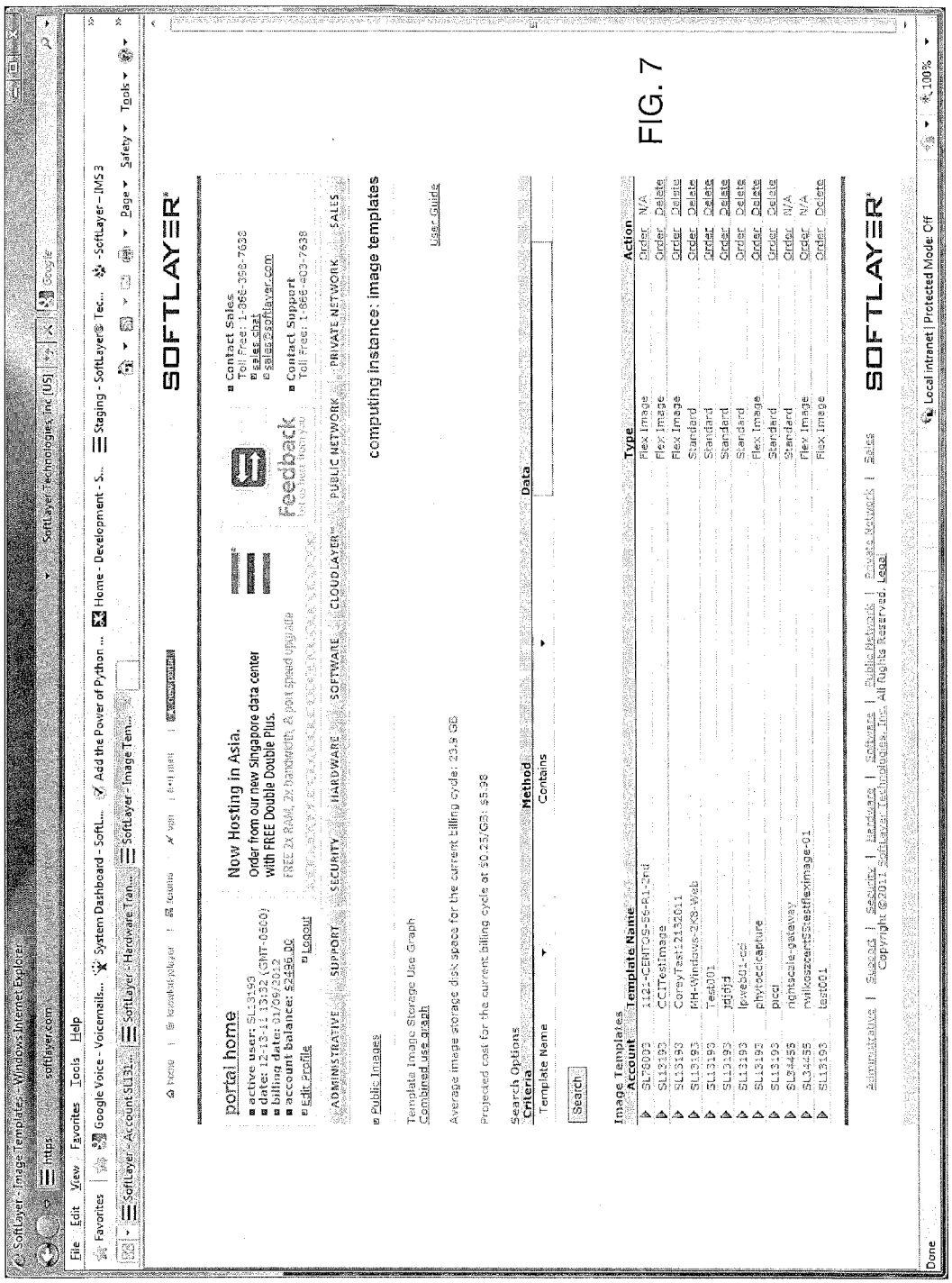
FIG. 7 is a screen shot of an exemplary image template selection screen via a customer web portal.
Figure 8:
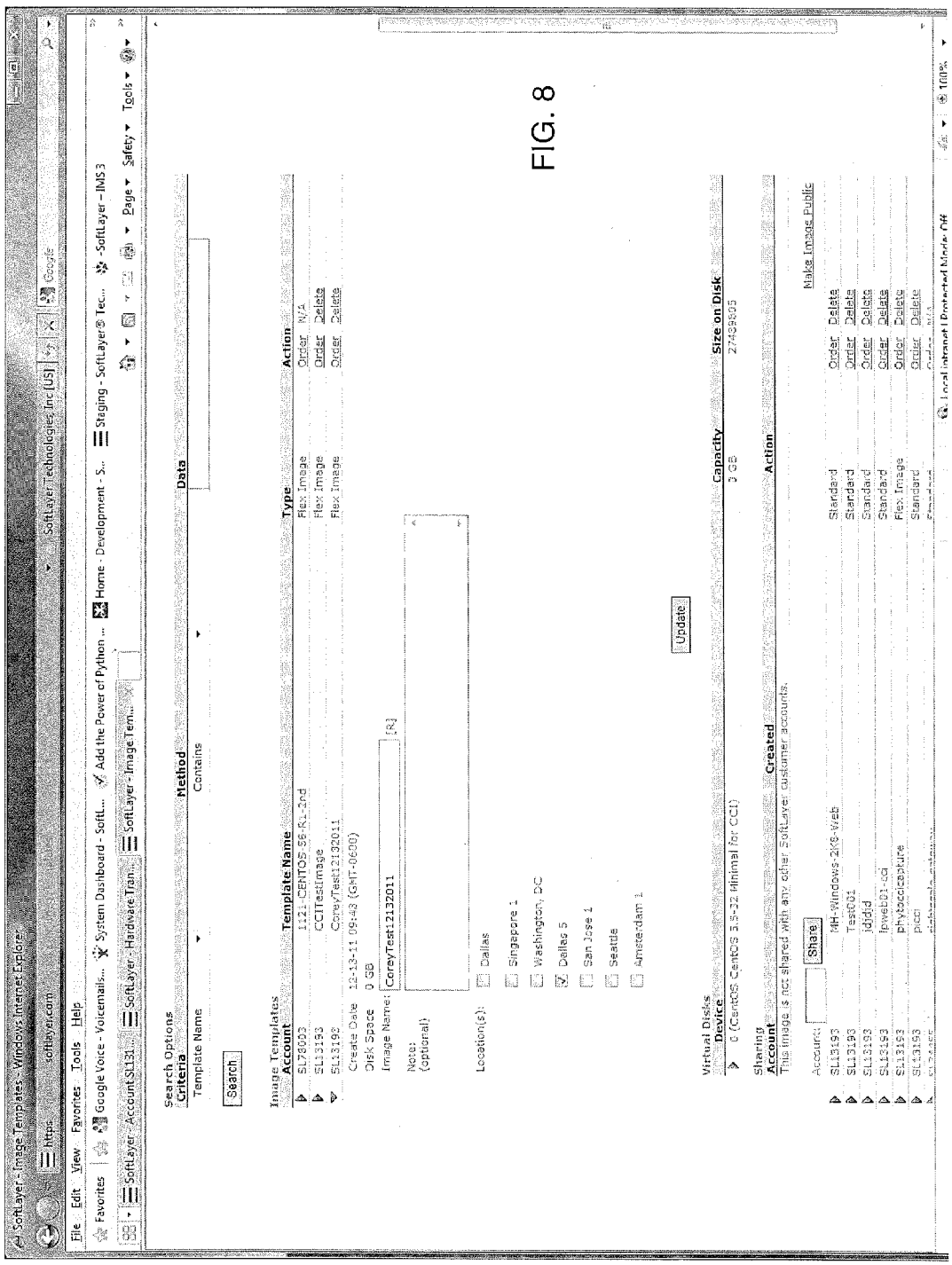
FIG. 8 is a screen shot of an exemplary image template selection screen enabling the user to select image storage locations via a customer web portal.

FIG. 7 is a screen shot of an exemplary image template selection screen via a customer web portal at which the end user may select an image template. The web application/portal include a graphical user interface, and may employ various protocols such as Hypertext Transfer Protocol (HTTP) to relay data or commands. In this exemplary embodiment, the type field may include "Standard" or "Flex Image" image templates. A "Standard" image template is applicable or deployable to virtual servers only, while a "Flex Image" template is applicable or deployable to both virtual servers and dedicated servers. The user may select one of the stored image templates from the image repository, which leads to another screen show in FIG. 8. FIG. 8 is a screen shot of an exemplary image template selection screen enabling the user to select image storage locations via the customer web portal. The user is given the opportunity to assign a new name to the image, and indicate the data center location (geographical location) to store the image. The user may select more than one data center location to store the image.

Continuing with FIG. 3, in block 56, the user selected image is deployed to the data center selected by the user to a dedicated or virtual server. The '065 patent referenced above may be consulted for exemplary details of the deployment process. The process ends in block 58.

Figure 4:
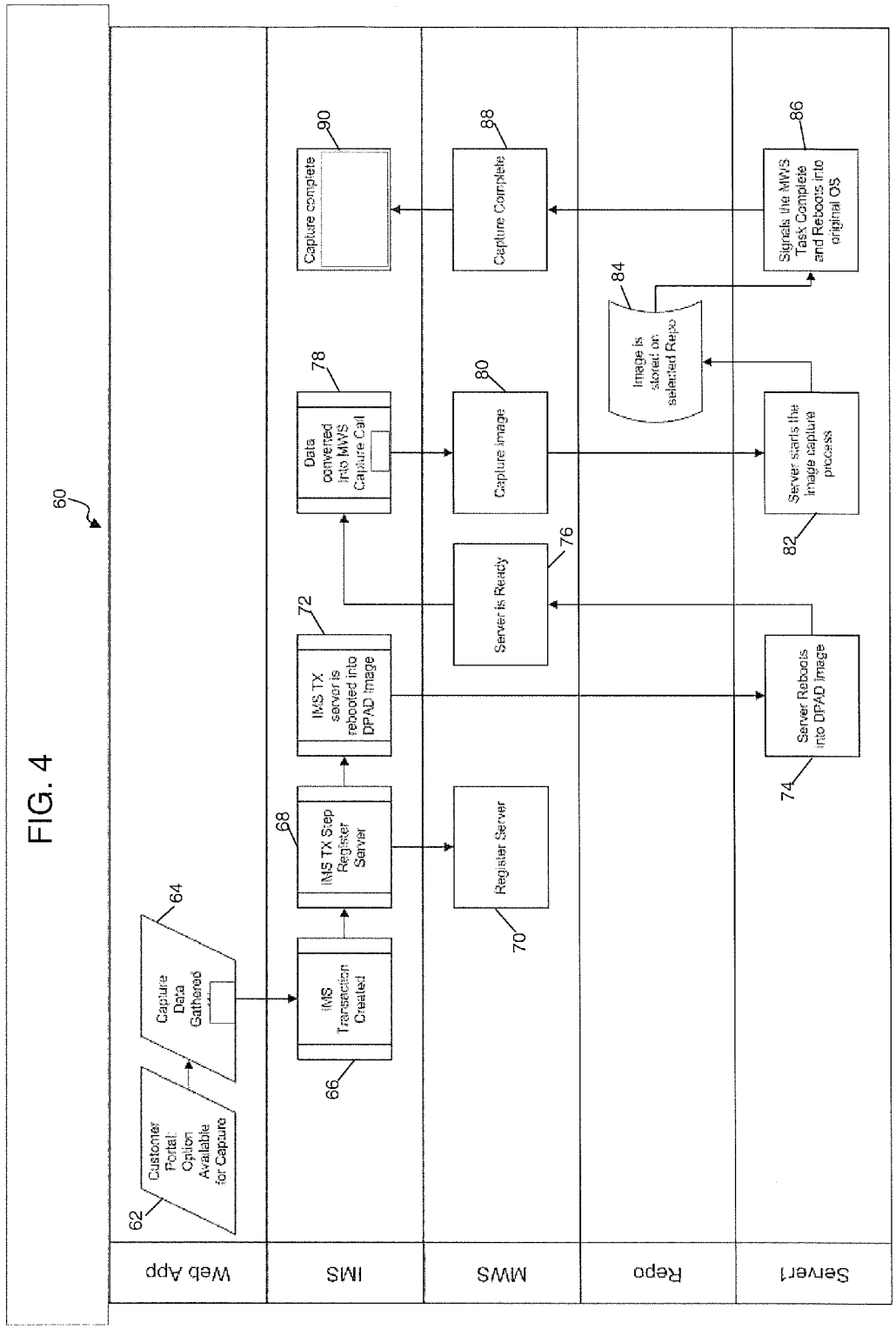
FIG. 4 is a simplified data flow diagram of an exemplary process of server image capturing according to an embodiment of the present disclosure.

FIG. 4 is a simplified data flow diagram of an exemplary process 60 of offline server image capturing according to an embodiment of the present disclosure. In block 62, the option to capture an image is provided to the user via the customer web portal. In block 64, the user's entry of data related to the server image and other data are received and collected. In block 66, the integrated management system (IMS) creates a new transaction based on the collected data. In blocks 68 and 70, the integrated management system instructs the management workstation to register the server, and the management workstation does so accordingly. In blocks 72 and 74, the integrated management system requests and the dedicated server or virtual server reboots into a provisioning agent (DPAD) image. In block 76, the management workstation is notified that the server is ready, and in block 78, the integrated management system converts the collected data into a management workstation capture call. The management workstation is instructed to capture the image in block 80, and the dedicated or virtual server starts the image capture process in block 82. In block 84, the captured server image is stored on the selected image repository (geographical or data center location). In block 86, the server signals the management workstation that the capture task is completed and reboots into its original operating system. In block 88, the management workstation determines that the capture process is completed, and similarly notifies the integrated management system.

It should be noted that online server image capture may also be performed but locked files may not be able to be copied or captured.

Figure 9:
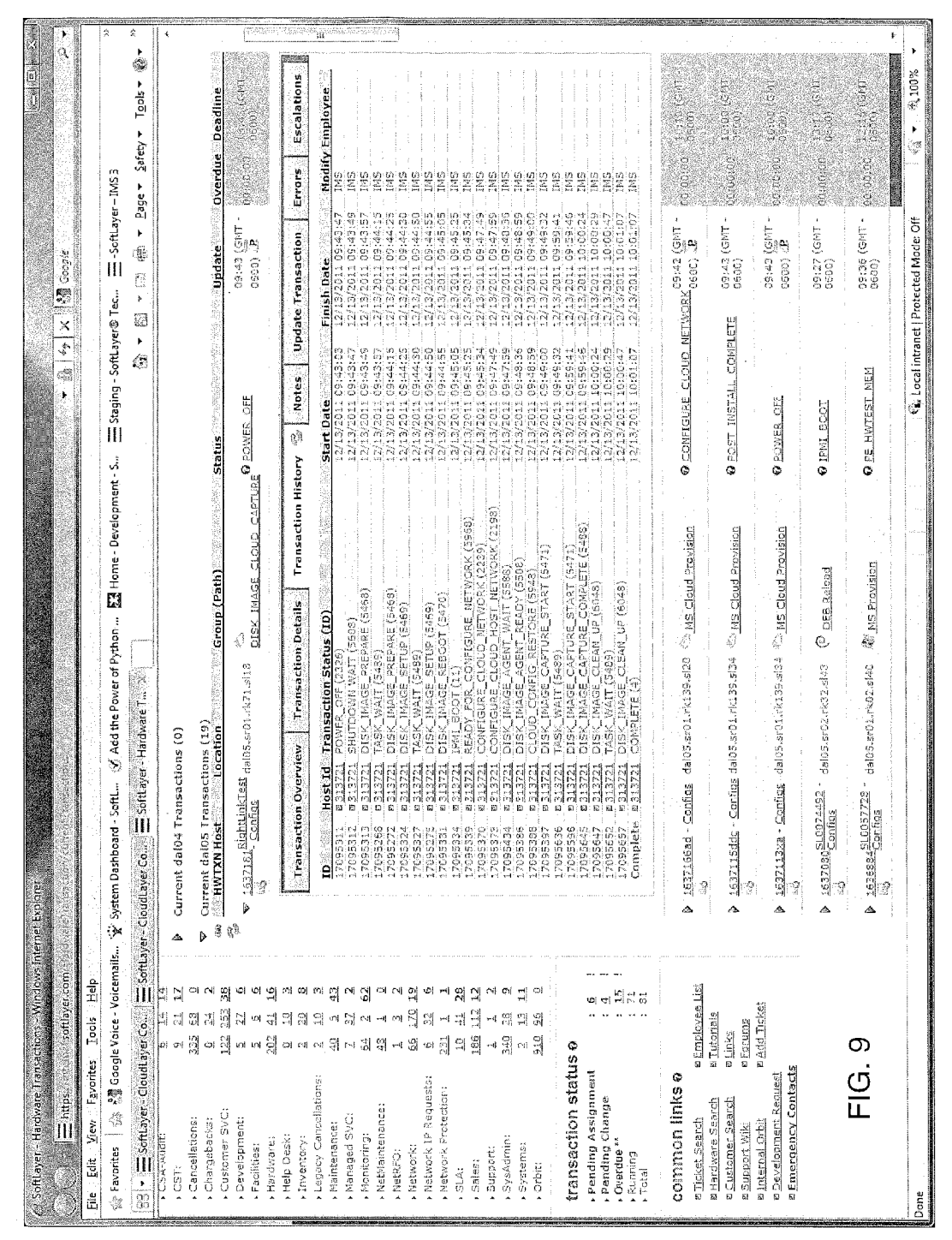

As shown in FIG. 9, a screen shot of an exemplary disk image cloud capture screen via a customer web portal provides additional detailed steps in the capture process.

Figure 5:
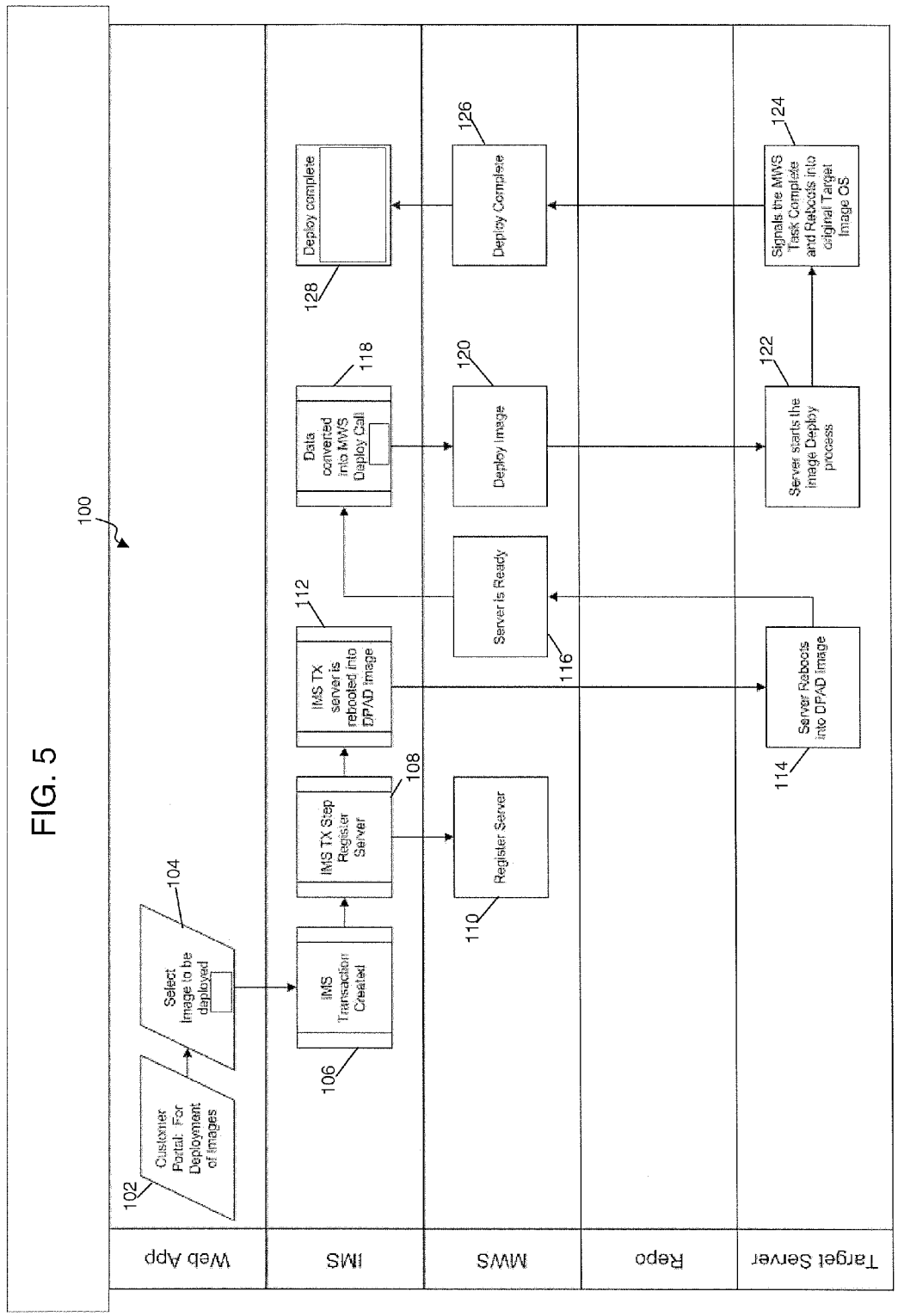
FIG. 5 is a simplified data flow diagram of an exemplary process of image deployment to an existing server according to an embodiment of the present disclosure.

FIG. 5 is a simplified data flow diagram of an exemplary process 100 of image deployment to an existing server according to an embodiment of the present disclosure. In block 102, the option to deploy an image is provided to the user via the customer web portal. In block 104, the user's selection of a server image is received. In block 106, the integrated management system (IMS) creates a new transaction based on the server imager selection and other data. In blocks 108 and 110, the integrated management system instructs the management workstation to register the server, and the management workstation does so accordingly. In blocks 112 and 114, the integrated management system requests and the dedicated server or virtual server reboots into the provisioning agent (DPAD) image. In block 116, the management workstation is notified that the server is ready, and in block 118, the integrated management system converts the received data into a management workstation deployment call. The management workstation is instructed to deploy the server image in block 120, and the dedicated or virtual server starts the server image deployment process in block 122. In block 124, the dedicated or virtual server communicates to the management workstation that deployment is completed and reboots into the original target image operating system. In blocks 126 and 128, the management workstation determines that the deployment process is completed, and notifies the integrated management system.

Figure 6:
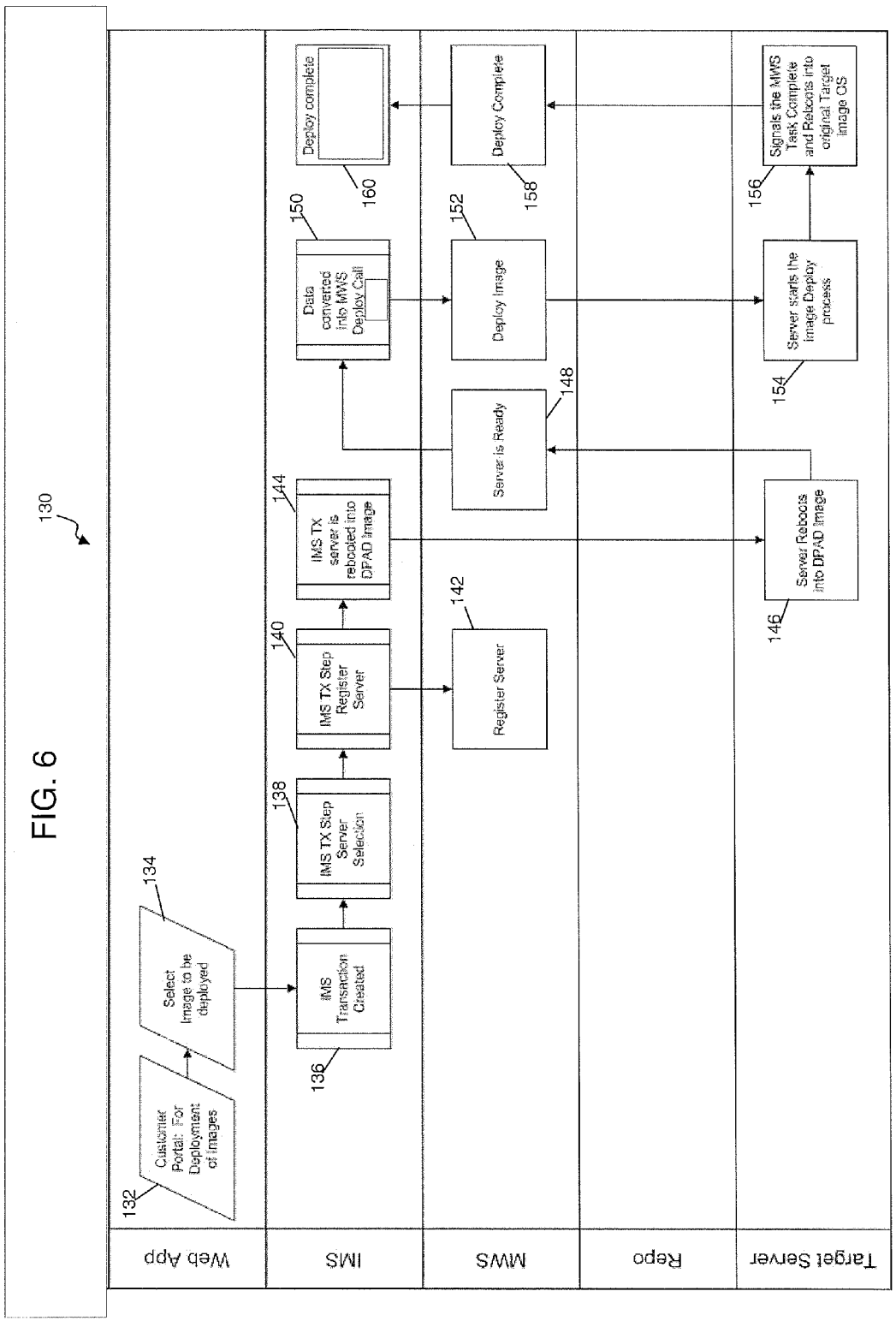
FIG. 6 is a simplified data flow diagram of an exemplary process of image deployment to a new physical server according to an embodiment of the present disclosure.

FIG. 6 is a simplified data flow diagram of an exemplary process 130 of image deployment to a new physical server according to an embodiment of the present disclosure. In block 132, the option to deploy an image is provided to the user via the customer web portal. In block 134, the user's selection of a server image is received. In block 136, the integrated management system (IMS) creates a new transaction based on the server imager selection and other data. In blocks 138, 140 and 142, the integrated management system receives a server dedicated or virtual server selection, then instructs the management workstation to register the server, and the management workstation does so accordingly. In blocks 144 and 146, the integrated management system requests and the dedicated server or virtual server reboots into the provisioning agent (DPAD) image. In block 148, the management workstation is notified that the server is ready, and in block 150, the integrated management system converts the received data into a management workstation deployment call. The management workstation is instructed to deploy the server image in block 152, and the dedicated or virtual server starts the server image deployment process in block 154. In block 156, the dedicated or virtual server communicates to the management workstation that deployment is completed and reboots into the original target image operating system. In blocks 158 and 160, the management workstation determines that the deployment process is completed, and notifies the integrated management system.

Figure 10:
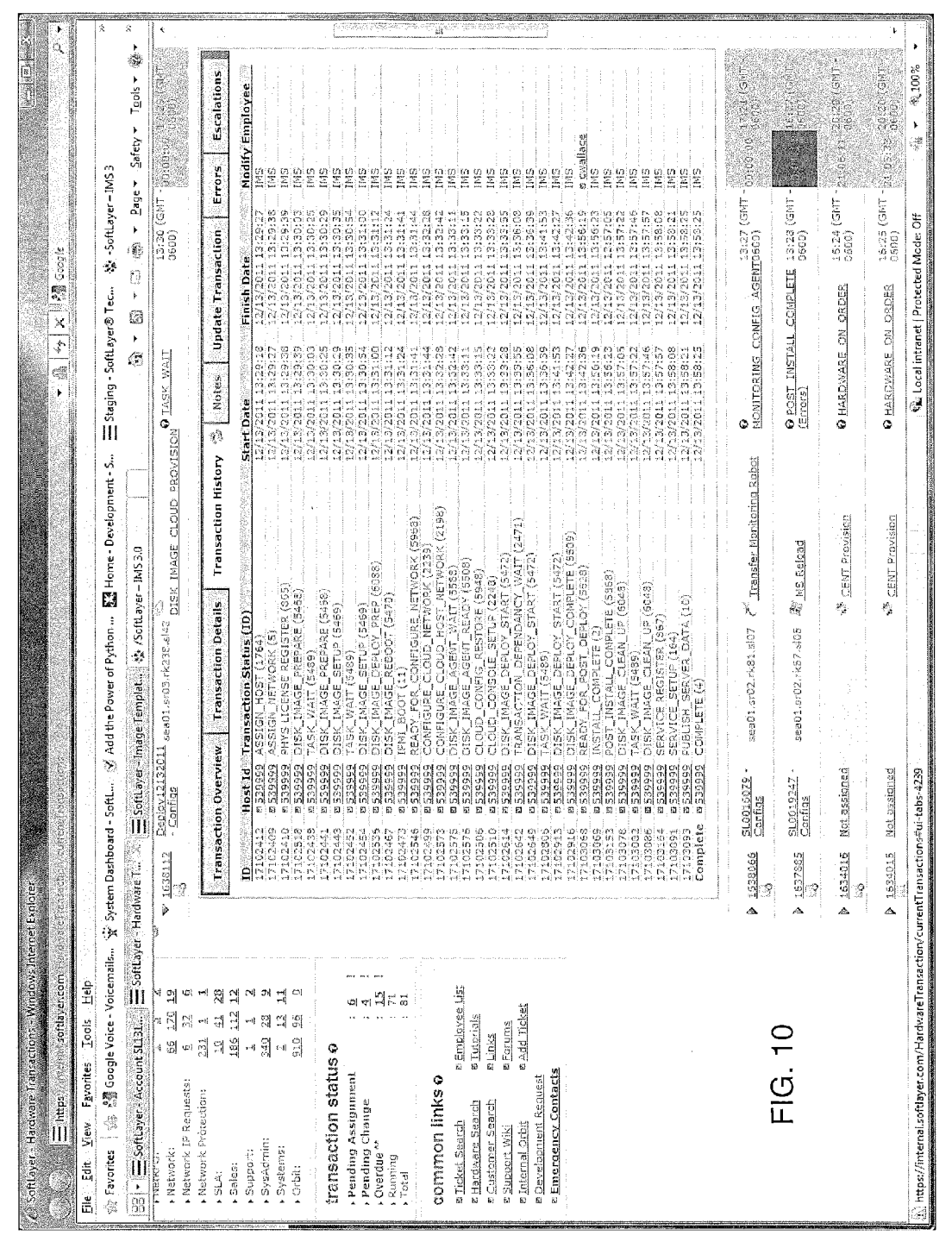

As shown in FIG. 10, a screen shot of an exemplary disk image cloud deployment screen via a customer web portal provides additional detailed steps in the server image deployment process.

Accordingly, the system and method describe herein are operable to capture the image of any dedicated and virtual server, located at any data center, store the captured image at any cloud store (data center) location, and deploy the captured image to any existing or new dedicated or virtual server at any data center.

The lines between physical and virtual IT resources are being erased with the introduction of the disclosed system and method, which allow users to capture, replicate, and store an image of a cloud or dedicated server, and then deploy the image on either type of computing environment. Capabilities traditionally in the domain of virtual infrastructure, including the ability to quickly clone and reload servers, are extended to dedicated servers, along with cross-platform compatibility and simple migration between physical and virtual environments. Key features and benefits include:

Universal images that can be used interchangeably on dedicated or cloud systems

Unified image library for archiving, managing, sharing, and publishing images

Greater flexibility and higher scalability

Rapid and easy migration

Available via the company's management portal and API

The features of the present invention which are believed to be novel are set forth below with particularity in the appended claims. However, modifications, variations, and changes to the exemplary embodiments described above will be apparent to those skilled in the art, and the system and method described herein thus encompass such modifications, variations, and changes and are not limited to the specific embodiments described herein.

What is claimed is:

1. A method of portable and flexible deployment of dedicated and virtual servers comprising:

receiving, at a user interface, a user input of an order requesting the deployment of a dedicated or virtual server at a specified data center location;

receiving, at a first screen at the user interface, a user input of a selection of a server image pertaining to the server to be deployed from a list of server image templates presented to the user in the first screen, said server image templates being stored at an image template repository;

in response to said receiving the selection of a server image, presenting to the user at the user interface a second screen enabling the user to select one or more geographic locations, from a menu displayed on the second screen of two or more distinct geographic locations, for storing and deploying the selected server image in a data center at each selected geographic location;

creating, at an integrated management system, a deployment transaction based on data relating to the server image and collected from the user as a response by the user to an option presented to the user at the user interface for capturing the server image;

automatically selecting a server according to the user input of the selected server image;

automatically deploying the selected server including a specification of an operating system to the selected server in response to having deployed the selected server image; and automatically booting the selected server using the specified operating system.

2. The method of claim 1, further comprising:

receiving, at the user interface, a user input of an order requesting the capturing of a server image;

receiving a user selection of at least one data center location for storing the captured image;

capturing the server image; and storing the captured image at the at least one data center location according to the user selection.

3. The method of claim 2, wherein said receiving the user selection of at least one data center location for storing the captured server image comprises receiving the user selection of two or more different data center locations for storing the captured sever image, and wherein said storing the captured server image comprises storing the captured server image at the two or more different data center locations.

4. The method of claim 2, wherein said capturing the server image comprises capturing the server image from a first data center location, wherein said storing the captured image at the at least one data center location comprises storing the captured image at a second data center location, wherein the specified data center location is a third data center location, wherein said deploying the selected server image comprises deploying the selected server image at the third data center location, wherein the first data center location, the second data center location, and the third data center location are different data center locations.

5. The method of claim 4, wherein the method comprises:
a data center at said second data center location controlling said capturing the server image from the first data center location.

6. The method of claim 4, wherein the method comprises:
a data center at said third data center location controlling said capturing the server image from the first data center location.

7. The method of claim 1, further comprising receiving a user selection of one of dedicated server and virtual server for deploying a captured image.

8. The method of claim 1, wherein the selected server image comprises a root file system, a kernel, applications, and data of the dedicated or virtual server.

9. The method of claim 1, wherein the dedicated or virtual server is said dedicated server which is a physical server having dedicated access for a particular end user, and wherein the method further comprises:
receiving, at the user interface, a specification of bus speed, cache capacity, random access memory (RAM), a number of processors, and a manufacturer, type, and processor speed of each processor, for the dedicated server.

10. The method of claim 1, wherein the dedicated or virtual server is said virtual server, and wherein the method further comprises:
receiving, at the user interface, a specification of a desired amount of processor speed, random access memory (RAM) capacity, and storage capacity of local or storage area network (SAN) storage, for the virtual server.

11. The method of claim 1, wherein the menu displayed on the second screen of two or more distinct geographic locations is a menu of two or more different cities.

* * * * *